Nov. 23, 1943.   R. ROUDNICKY   2,334,885
RATE-OF-CLIMB INDICATOR OR THE LIKE FOR AIRCRAFT
Filed Aug. 17, 1940
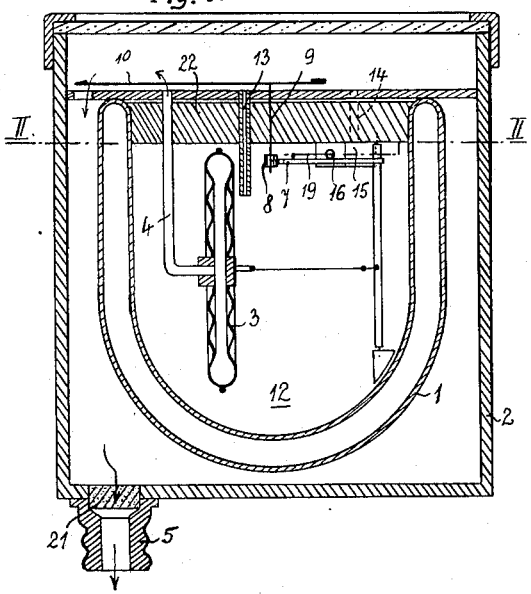
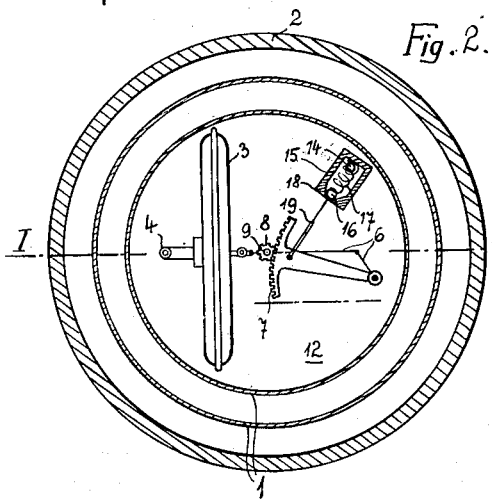
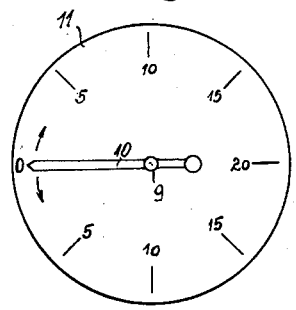
INVENTOR.
Rudolf Roudnicky
BY
Ben. J. Chromy
ATTORNEYS.

Patented Nov. 23, 1943

2,334,885

UNITED STATES PATENT OFFICE 2,334,885

RATE-OF-CLIMB INDICATOR OR THE LIKE FOR AIRCRAFT

Rudolf Roudnický, Prague, Czechoslovakia; vested in the Alien Property Custodian Application August 17, 1940, Serial No. 353,148
In Czechoslovakia April 7, 1938

2 Claims. (Cl. 73—179)

This invention relates to rate-of-climb indicators and the like for aircraft, of the type in which the barometric pressure mechanism, such as an aneroid capsule or diaphragm, is contained in a heat-insulated casing and communicates with the outer atmosphere through a tube and in which the interior of the casing itself communicates with the outer atmosphere through a capillary tube. Altimeters of this type suffer from the disadvantage that, if the aircraft changes its altitude too rapidly the pressure within the heat-insulated casing cannot become equal to that of the outer atmosphere sufficiently quickly, so that as atmospheric pressure also prevails inside the barometric pressure mechanism, the latter, which in view of the sensitivity required consists of extremely thin sheet metal, becomes damaged.

The object of the present invention is to overcome this disadvantage, and this is achieved by providing the interior of the heat-insulated casing, in which the aneroid capsule or the like is arranged with a valve which is automatically opened by a movable part of the transmission leverage of the altimeter, or directly by the wall of the aneroid capsule, or by an auxiliary aneroid capsule, as soon as a certain maximum allowable value of difference of pressure between the outer atmosphere and the interior of the casing is reached, so that the pressure prevailing in the casing becomes, through such valve, at once equal to that of the outer atmosphere. This arrangement is advantageously supplemented by a filter plug by means of which the effect of the rapidly changing pressure of the outer atmosphere on the aneroid capsule or the like is also retarded.

In the drawing, in which an embodiment of the invention is illustrated, with the required details, by way of example, Fig. 1 is a vertical section on the line I—I of Fig. 2, Fig. 2 is a section on the line II—II of Fig. 1, Fig. 3 is a plan view of the altimeter scale, and Fig. 4 is a vertical section of a modified embodiment.

Referring to the drawing, the altimeter consists of a known, heat-insulated, double-walled, evacuated casing 1, which is arranged in the cylindrical protective casing 2 and contains a known form of barometric pressure mechanism such as an aneroid capsule 3, which communicates with the outer atmosphere through a small tube 4 by way of the free space in the casing 2 and the tubular fitting 5. This aneroid capsule acts, through a suitable lever mechanism 6, a gear section 7 and gear wheel 8, upon the shaft 9 of a pointer or indicator 10, which moves over a scale 11 provided on the upper side of the enclosed altimeter.

According to the invention the space 12 within the casing 1 communicates with the outer atmosphere through a capillary tube 13 in known manner to enable a gradual equalisation of the difference of pressure, as well as through a relief tube 14 of relatively large bore which opens into an auxiliary casing 15 having a non-return valve comprising a valve body 16 which is normally pressed down to its seat by a spring 17 and is positively connected with a movable part of the altimeter, for example with the gear sector 7 (Fig. 2) by a control rod 19. The valve body may, however, also be connected with some other part, for example it may be connected direct with the wall of the aneroid capsule 3, or with the wall of an auxiliary aneroid capsule, the hollow interior of which communicates directly with the outer atmosphere as shown for example in Fig. 4.

In the embodiment shown in Fig. 1 and Fig. 2 the control rod 19 is connected with the gear sector 7 and with the valve body 16, with the provision of a certain amount of play in such a manner that the valve body only opens or moves against the action of the spring 17, if the sector 7 has performed the maximum possible swing, for example from 0 to 20 on the scale 11, this swing also corresponding to the highest permissible pressure load of the aneroid capsule 3. As shown in Fig. 1, the casing 1 is preferably closed by a flat closing wall through which pass the pointer shaft 9, the tube 4, the capillary tube 13, and the relief tube 14.

If the aircraft descends by a small amount the difference in pressure will not reach the danger value, and the pointer 10 will not reach the graduation 20, but if the aircraft descends from a considerable height to a relatively low altitude within a very short period, the difference of pressure may exceed that limit, so that the valve 16 will be opened as soon as the pointer reaches the graduation 20 on the scale 11, and the pressure inside the casing 1 will at once become equal to that of the outer atmosphere, so that the pointer 10 will return to the position 0.

The correct adjustment of the control rod 19 is such that the pointer 10 points to the maximum graduation 20 of the scale in the first instance, and the positive connection of the control rod with the valve body 16 effected in that position. As long as the pointer 10 does not reach the value 20 on the scale 11, the valve 16 will not be opened.

According to a feature of the invention, a filter plug 21 of a suitable porous material, for example pumice stone or the like, is arranged in the tubular fitting 5 of the outer protective casing 2, which plug retains dust and, on the other hand, reduces the rate of flow of the air into or out of the aneroid capsule 3 in the case of any too sudden changes of altitude of the aircraft.

The upper end of the casing 1 is closed in known manner by a sealing stopper or partition 22, through which the sealed channels 4, 13, 14 already described, and the sealed shaft 9 of the pointer 10 are passed.

In Fig. 4 is illustrated the operation of the valve 16 with the aid of an auxiliary aneroid capsule 23, which is also arranged in the casing 1, with suitable alteration of the arrangement of the control rod 19. This control rod may have, with this embodiment, also a certain amount of play, up to the widest expansion of the aneroid capsule 23, before it begins to act on the valve body 16 on the seat 18. The aneroid capsule 23 communicates with the outer atmosphere by aid of the small tube 25.

I claim:

1. In a rate-of-climb indicator, an air-tight casing, an aneroid capsule mounted within said casing, displacement indicating means mechanically connected to said aneroid capsule for indicating the magnitude of the displacement thereof under different applied pressures, a small tube passing through said casing and connected to the interior of said aneroid capsule and at all times connecting the interior of said capsule to the atmosphere without said casing, a capillary tube passing through said casing and connecting the interior thereof with the atmosphere without said casing, a relatively large relief passage passing through said casing and connecting the interior thereof with the atmosphere without said casing, a relief valve mounted for controlling said relief passage and being normally resiliently urged into the closed position, and connecting means positively connecting said indicating means to said relief valve for opening said relief valve when said indicating means has been actuated into a predetermined position, whereby the pressure within said casing outside of said capsule is maintained below a predetermined maximum differential with respect to the air without said casing.

2. In a rate-of-climb indicator, an air-tight casing comprising a flat closing wall, an aneroid capsule mounted within said casing, a pointer shaft passing through said closing wall, a pointer carried on said shaft outside of said casing, a protective housing surrounding said casing and having a passage in its side connecting with the outer atmosphere, an aneroid capsule mounted within said casing, mechanical connecting means connecting said capsule to said shaft for rotating said shaft as said capsule is deformed, a small tube passing through said closing wall and connected to the interior of said capsule and at all times connecting the interior of said capsule through said housing to the atmosphere without said housing, a capillary tube passing through said closing wall and connecting the interior of said casing through said housing to the atmosphere without said housing, a relatively large relief passage passing through said closing wall and connecting the interior of said casing through said housing with the atmosphere without said housing, a relief valve mounted for controlling said relief passage and being normally resiliently urged into closed position, and actuating means positively connecting said shaft and said connecting means to said relief valve for opening said relief valve when said shaft and said pointer have been actuated into a predetermined position, whereby the pressure within said casing outside of said capsule is maintained below a predetermined maximum differential with respect to the atmosphere without said casing.

RUDOLF ROUDNICKÝ.